May 27, 1952     N. E. LEE     2,597,878
MOUNTING
Filed June 7, 1945
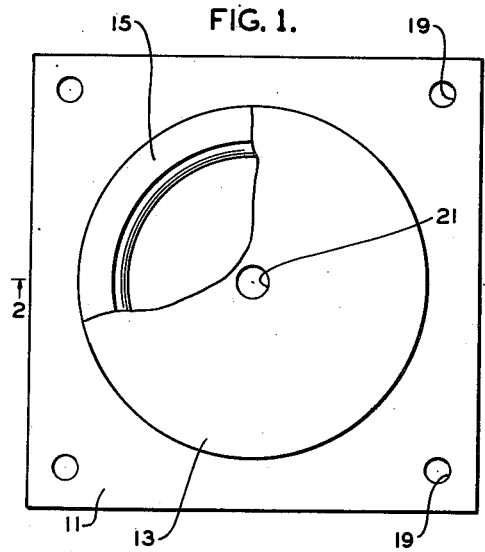
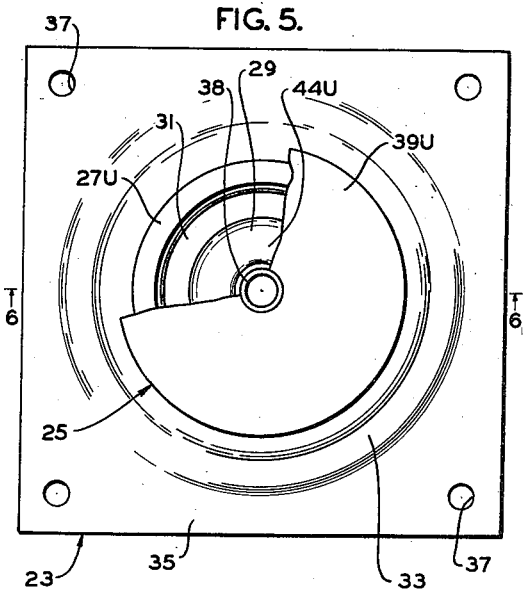
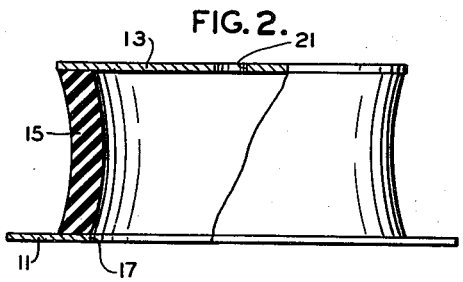
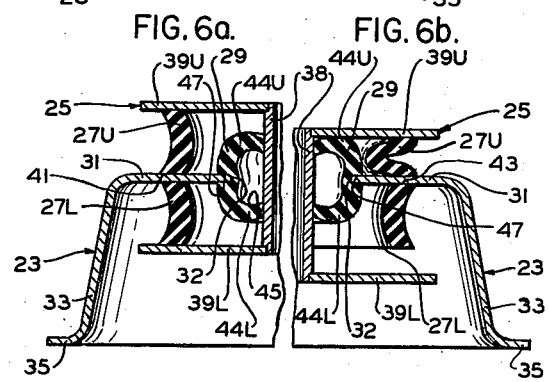
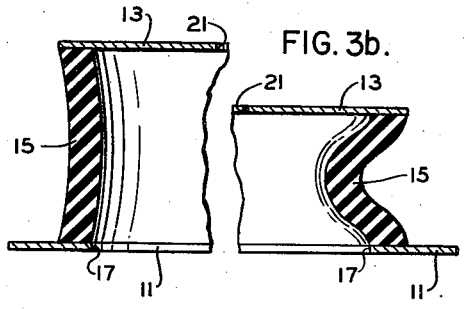
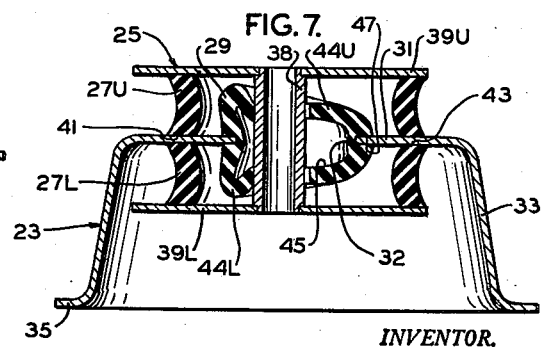
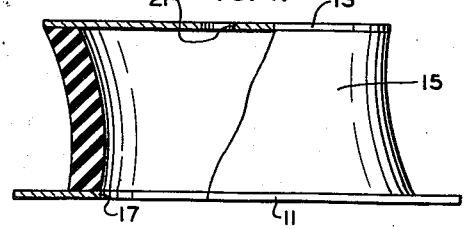
*INVENTOR.*
NORMAN E. LEE
BY
*William D. Hall,*
ATTORNEY Patented May 27, 1952

2,597,878

UNITED STATES PATENT OFFICE 2,597,878

MOUNTING

Norman E. Lee, Forest Hills, N. Y.

Application June 7, 1945, Serial No. 598,196

3 Claims. (Cl. 248—358)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to improvements in mountings and more particularly to improvements in mounting means of the type used to sustain a load relative to a base, so as to prevent or at least minimize the transmission of vibrations, shocks and noises from said load to said base and vice versa.

Some installations require mounts which will protect against a number of different kinds of impulses. For instance, in aircraft sensitive apparatus must be shielded from forced vibrations of the engines and associated parts, at various speeds including that at which there are generated vibrations of the resonant frequency of the mounted equipment, and also from relatively mild shocks occurring in rough air and when landing.

In marine installations, provision must be made not only against vibrations set up by the engines, shafts and propellers, which operate at variable speeds, usually of lower frequencies than in aircraft, but also against deflections caused by pitching and rolling of the vessel.

In vehicular installations the problem is more complicated as the supports must provide protection against forced vibrations of the engines and associated parts, operating at variable speeds, including the natural vibrating frequencies; vibrations due to substantially uniform, minor irregularities of the road beds traversed by the vehicles, which usually have abrupt wave-forms; and shocks due to holes and abnormal irregularities in the road surfaces. These conditions are greatly exaggerated in the case of military vehicles which often must cover terrain far rougher than that covered by other vehicles and which may also be subjected to ballistic impacts and concussions.

Vibration and shock mounts of the prior art, although used in tremendous quantities, have been found to be badly defective in performing their intended purposes.

Some mountings operate to attenuate deflections only in one direction of movement, such as vertical, and are therefore unsuited to installations requiring attenuation in several directions, as both vertical and horizontal.

Some are equipped with snubbers which come into play abruptly when the deflections reach a certain amplitude and, as a result, they set up violent counterforces and regularly recurrent shocks which are often more destructive to sensitive apparatus than the vibrations and shocks which the mounts are intended to absorb.

Again, some mounts are so designed that, if the spring material (such as rubber) is injured, as by tearing, or there is a separation of a bond between the spring material and the metal, the mounted equipment may separate entirely from the base and be severely damaged.

It is intended by the present invention to provide shock and vibration supports which are not attended by defects of earlier mounts.

It is an object of the present invention to provide means of supporting equipment which will be soft and resilient so as to isolate high frequency vibrations and which will also absorb shocks of greater force and amplitude without giving rise to any countershocks.

It is a further object to provide supporting means which will cushion displacements in different directions, such as in vertical, horizontal and rotational.

It is another object to provide spring means for mounts which may be so arranged in a mount that tensile loading of the spring material may be eliminated, thereby avoiding drift and injury sometimes resulting from such loading.

It is also an object to provide a mount which, despite unusual vibrations and shocks, and wear and tear, will not allow the equipment sustained thereby to tear loose entirely from the base.

Still another object is to provide mounts, the external dimensions of which allow them to be substituted for presently manufactured mounts without necessitating structural changes in either the base or the load.

A still further object is to provide mounts designed to absorb and attenuate shocks to such a degree as to eliminate the need of snubbers and thereby avoid the countershocks frequently caused thereby.

It is still another object to provide mounts wherein metal to metal contacts are eliminated and hence the transfer of sound, as well as vibration and shock, is inhibited.

The foregoing objects, and others which will become clear from the following specification, are accomplished by mounts embodying the present invention.

In general, the present invention resides in vibration and shock mounts wherein the isolation and absorption of vibrations and shocks is accomplished by a spring system including a spring element which flexes upon deflection. Two preferred geometries of such a spring element are shown, one being an inwardly bowed tubular member, of rubber or the like, which flexes inwardly upon any deflection which causes an axial shortening thereof, the other being a tire-shaped collar of rubber or the like, the walls of which are bowed outwardly so that a shortening, in a radial direction, of any sector of said collar causes said walls to flex outwardly.

One preferred embodiment (Figures 1-4) comprises two parallel plates joined to the ends of an inwardly bowed, tubular spring member of flexible material. When one of said plates is vibrated longitudinally relative to the other, the said spring member is subjected alternately to flexure and tension. Said embodiment is intended particularly to isolate high frequency vibrations such as those resulting from the operation of internal combustion engines and the like, but the structure is such that shocks of lower frequency and greater amplitude will also be attenuated as an increasing recovery force is stored up in the spring member as the amplitude of deflection increases and, hence, the deflection is decelerated without the abrupt jar ordinarily occurring in shock mounts using bumpers. Deflections in a lateral direction cause the tubular spring member to be put into shear thereby isolating such lateral deflections.

A modified embodiment (Figures 5-7) is made up of a pair of such tubular spring members disposed, respectively, above and below a central base plate so that the said spring members flex alternately and at no time is there longitudinal tension of the spring members such as is present in the first embodiment. In addition, a tire-shaped spring collar is interposed to absorb lateral deflections by flexure of its walls so that again attenuation is accomplished primarily through such flexure.

In the accompanying drawings, Figure 1 is a plan view of one form of mounting embodying the present invention, part of the load plate being broken away to show its interior, and the mount being shown in its condition when at rest;

Figure 2 is an elevational view of the mounting of Figure 1, partly sectioned along the line 2—2 of said Figure 1;

Figures 3a and 3b are fragmentary vertical sectional views, along the line 2—2 of Figure 1, Figure 3a showing the mount when the load plate is deflected upwardly, and Figure 3b when said load plate is deflected downwardly;

Figure 4 is an elevational view of the mounting of Figure 1, partly sectioned along the line line 2—2 of said Figure 1, showing the mount when the load plate is deflected laterally, to the left;

Figure 5 is a plan view of a modified type of mounting embodying the present invention, part of the upper load plate being broken away to show the interior, and the mount being shown in its condition when at rest;

Figures 6a and 6b are fragmentary vertical sectional views, along the line 6—6 of Figure 5, Figure 6a showing the mount in its condition when at rest, and Figure 6b showing the mount when the load spool is sustaining a downward deflection; and Figure 7 is a sectional view similar to Figures 6a and 6b, the load spool being shown deflected laterally to the left.

Referring now particularly to Figures 1-4 of the drawings, the mounting there illustrated comprises a base plate 11, a load plate 13 and a spring member 15. The base plate 11 is a horizontally disposed, square, flat, metal plate provided with a centrally positioned, large, circular opening 17 and four corner holes 19, receivable to bolts, rivets or other fastening means (not shown) to secure the mounting to a base (not shown). The load plate 13 is a flat, circular, metal plate, disposed above and spaced from the base plate 11 and parallel to it, and pierced by a small central aperture 21 receivable to a bolt or other fastening means (not shown) so that a load (not shown) may be secured thereto.

The spring member 15 is made of a resilient material, such as natural or synthetic rubber, is generally tubular in shape and is bowed inwardly, circumferentially, throughout its central portion. It is coaxially disposed with respect to the opening 17 and the aperture 21. The upper end of said spring member 15 is secured to the undersurface of the outer peripheral portion of the load plate 13, as by a suitable rubber to metal bonding process, and its lower end is similarly secured to the upper surface of the inner marginal portion of the base plate 11.

In the use of the mount just described (Figures 1-4) the base plate 11 and load plate 13, respectively, are secured by any suitable fastening means (not shown) through the holes 19 and the aperture 21, to two objects to be vibrationally isolated from each other. Thus, the base plate 11 may be secured to the framework of a unit of electronic equipment and a high speed electrical generating plant, being one of the components of said equipment, may be fastened to the load plate 13.

If so installed, the load plate 13 will be subjected to vertical oscillations during operation of the generating plant aforesaid. When the load plate 13 is deflected downwardly, the spring member 15 is caused to flex inwardly, as shown in Figure 3b, and when said plate 13 is deflected upwardly, as shown in Figure 3a, the spring member 15 is stretched vertically. It is therefore seen that, as the load plate 13 is caused to oscillate vertically, the tubular spring member 15 is alternately subjected to flexure and tension, thus resulting in a relatively soft mounting, well adapted to attenuate high frequency vibrations. When the load plate 13 is deflected downwardly a relatively large amount, the force opposing such movement will increase progressively. Hence, the vertical deflection will be stopped gradually and without the jar which occurs in mounts provided with bumpers.

The amount of Figures 1-4 will also attenuate horizontal displacements of the plates 11, 13 relative to each other. Figure 4 illustrates what happens when the load plate 13 is deflected laterally to the left. The spring member 15 is then caused to lean over toward the left and said member 15 is put into shear.

Referring now more particularly to Figs. 5-7, the modified form of mounting embodying the present invention, there shown comprises a base member 23, a load spool 25, two spring members 27U, 27L and a spring collar 29.

The base member 23 may be made of sheet metal and it includes a horizontally disposed, circular base plate 31, which is provided with a central circular opening 32. A skirt-like circular housing 33 extends downwardly, divergingly, from the outer periphery of said plate 31, and a flange 35, of square outer configuration, extends outwardly, horizontally, from the lower periphery of said housing 33 and is pierced by four holes 37, receivable to bolts or other suitable fastening means (not shown).

The load spool 25 is made up of a vertically disposed, metal, tubular core 38, to the ends of which are rigidly secured, by swaging, welding or otherwise, the flat, circular, metal, upper and lower load plates 39U, 39L. The plate 31 of the base member 23 encircles the core 38 and is disposed intermediate the upper and lower load plates 39U, 39L.

Disposed between the said plate 31 and the upper load plate 39U is the upper spring member 27U. Said member is made up of a suitable flexible material, such as natural or synthetic rubber, and is generally tubular in shape and its central circumferential portion is bowed inwardly. Its lower end 41 is secured, as by a metal to rubber bonding process, to the upper surface of the base plate 31. The lower spring member 27L is of the same construction as its upper counterpart 27U and it is similarly disposed between the base plate 31 and the lower load plate 39L, its upper end 43 being similarly secured to the lower surface of the base plate 31.

The spring collar 29 is also made up of a flexible material, such as natural or synthetic rubber, and it is shaped generally like a vehicular tire, the axis of which is vertically disposed. The upper and lower walls 44U, 44L of said collar 29 are bowed upwardly and downwardly respectively. Said collar 29 makes a loose sliding fit about the core 38, is hollowed out to form an annular channel 45 and is also provided with a horizontally disposed, circumferential slot 47 into which is positioned the inner peripheral portion of the base plate 31, the latter being secured in said slot, as by a metal to rubber bond.

In the use of the modified form of the present invention, as illustrated in Figures 5–7, the base member 23 and the load spool 25 are secured respectively to two pieces of equipment, etc., which are to be vibrationally insulated from each other. Thus, the base member 23 may be secured to a foundation (not shown), by bolts or other suitable fastenings (not shown) through the holes 37, and the load spool 25 may be secured to a high speed electrical generating plant, by means of a bolt (not shown) through the hole in the core 38.

When so installed the operation of said mounting (Figures 5–7) is as follows: as the generating plant runs, vibrations thereof cause the load spool 25 to oscillate. When the load spool 25 is deflected downwardly (as shown in Figure 6b) the upper spring member 27U is caused to flex inwardly, so as to take the position indicated in said figure. Although the distance between the base plate 31 and the lower load plate 39L is then increased, the lower spring member 27L is not subjected to tension as its lower end is not secured to said plate 39L and the latter merely moves downwardly away from said member 27L. At the same time the core 38 moves downwardly relative to the collar 29.

When the load spool 25 is deflected upwardly, by an upward oscillation of the generating plant, the reverse of the condition shown in Figure 6b takes place; viz., the lower spring member 27L is flexed inwardly, by being squeezed between the base plate 31 and the lower load plate 39L, and the upper load plate 39U moves upwardly away from the upper end of the upper spring member 27U. Thus, it is seen that, as the spool 25 oscillates vertically the spring members 27U, 27L are flexed alternately, but are never subjected to tension.

The effect of horizontal oscillations of the generating plant is illustrated in Figure 7 where the load spool 25 is shown deflected laterally to the left. The spring members 27U, 27L are unaffected by such deflection of the load spool 25, as they are bonded to the base plate 31 and are not connected to the spool 25 at all. However, such lateral movement of the spool 25 does cause deformation of the spring collar 29, as shown in said Figure 7. The walls 44U, 44L, to the left side of the core 38, are then caused to flex upwardly and downwardly, respectively.

It will be noted that the modified embodiment of the present invention (Figures 5–7) has the advantage over the other embodiment (Figures 1–4) that the spring members 27U, 27L are at no time subjected to tension. In view of this entire absence of tension, there is less likelihood of injury to the spring members 27U, 27L and less likelihood of drift due to tension. It will also be noted that the same sort of soft action, which takes place with vertical deflections, occurs with horizontal deflections, as one side or another of the spring collar 29 is subjected to flexure. Another advantage of the second form (Figures 5–7) is that the load can never break loose from the base, even should the spring members 27U, 27L and the spring collar 29 fail for any reason, as the base member 23 and the load spool 25 are locked to each other, the base plate 31 being unable to free itself from the said spool 25.

Although the operations of the mounts illustrated have been described only when said mounts are subjected to direct vertical and horizontal deflections, it will be understood that deflections in all other directions will merely be combinations of the direct deflections described.

Although the embodiments illustrated in the drawings have particular geometries, it will be understood that various changes in geometry may be made within the spirit of the invention. Such changes in geometry and changes in the relative sizes of the elements and other modifications may be made to suit the present invention to different compounds of natural or synthetic rubber, to different loading values, etc.

It will be understood that, although in the foregoing specification certain elements of the mounts there disclosed were indicated to be secured to a base, and other elements to a load, the mounts will operate if secured in the opposite order.

While there have been described what at present are considered preferred embodiments of the present invention, it will be obvious to those skilled in the art that various changes and modifications may be made therein without departing from the invention and it is, therefore, aimed in the appended claims to cover such changes and modifications as fall within the true spirit and scope of the invention.

What is claimed is:

1. A mounting comprising a substantially flat base plate; a central opening through said plate; a load spool including a central core substantially normal to said plate and extending through said opening, and two load plates secured to said core and substantially parallel to said base plate; two spring members, one disposed between the base plate and one load plate, and the other disposed between the base plate and the other load plate, each of said spring members being of springy flexible material and bowed inwardly at its central portion so as to immediately flex upon longitudinal shortening thereof; a spring collar of springy flexible material encircling said core and shaped substantially like a vehicular tire, including walls bowed outwardly so as to immediately flex upon lateral shortening of a sector thereof; said spring collar being positioned so that its outer periphery is substantially contiguous with the inner periphery of the base plate aforesaid.

2. A mounting comprising a substantially flat base plate; a central opening through said plate; a load spool including a central core substantially normal to said plate and extending through said opening, and two load plates secured to said core and substantially parallel to said base plate; two spring members, one disposed between the base plate and one load plate, and the other disposed between the base plate and the other load plate, each of said spring members being of springy flexible material and of such configuration as to immediately flex upon longitudinal shortening thereof; a spring collar of springy flexible material encircling said core and shaped substantially like a vehicular tire, including walls of such configuration as to immediately flex upon lateral shortening of a sector thereof; said spring collar being positioned so that its outer periphery is substantially contiguous with the inner periphery of the base plate aforesaid.

3. A mounting comprising a substantially flat base plate; a central opening through said plate; a load spool including a central core substantially normal to said plate and extending through said opening, and two load plates secured to said core and substantially parallel to said base plate; two spring members, one disposed between the base plate and one load plate, and the other disposed between the base plate and the other load plate, each of said spring members being of springy flexible material and bowed at its central portion so as to immediately flex upon longitudinal shortening thereof; a spring collar of springy flexible material encircling said core and shaped substantially like a hollow vehicular tire, including two spaced walls bowed so as to immediately flex upon radial shortening of a sector thereof; said spring collar being positioned so that its outer periphery is substantially contiguous with the inner periphery of the base plate aforesaid.

NORMAN E. LEE.

REFERENCES CITED

The following references are of record in the file of this patent:

UNITED STATES PATENTS

| Number | Name | Date |
| --- | --- | --- |
| 576,352 | De Sparre | Feb. 2, 1897 |
| 1,900,448 | King | Mar. 7, 1933 |
| 2,275,966 | Julien | Mar. 19, 1942 |
| 2,382,372 | Wallerstein | Aug. 14, 1945 |
| 2,443,201 | Sluyter | June 15, 1948 |
| 2,502,313 | Dodge | Mar. 28, 1950 |

FOREIGN PATENTS

| Number | Country | Date |
| --- | --- | --- |
| 143,349 | Switzerland | Jan. 16, 1931 |
| 385,912 | France | May 30, 1908 |
| 620,856 | France | Apr. 30, 1927 |